Dec. 4, 1962  F. REMINGTON ET AL  3,066,784
CONVEYORS
Filed May 19, 1961
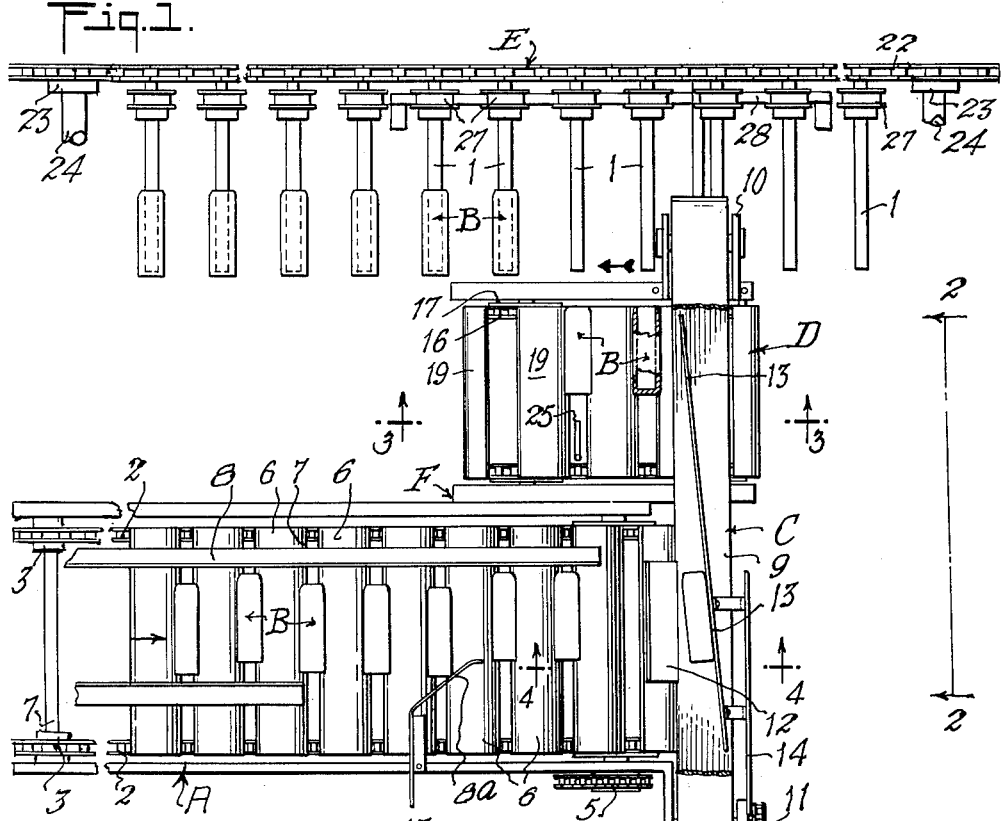
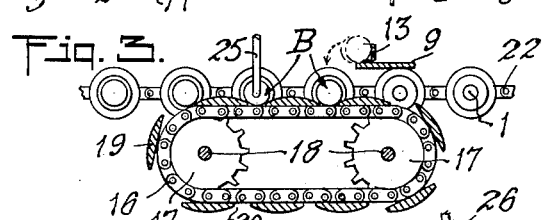
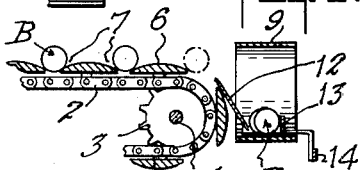
INVENTORS.
FREDERIC REMINGTON
RICHARD A. TARTAGLIA
BY
*Harry B. Cook,*
ATTORNEY

United States Patent Office 3,066,784
Patented Dec. 4, 1962

3,066,784
CONVEYORS

Frederic Remington, Elizabeth, and Richard A. Tartaglia, East Orange, N.J., assignors to Peerless Tube Company, Bloomfield, N.J., a corporation of New Jersey
Filed May 19, 1961, Ser. No. 111,336
6 Claims. (Cl. 198—20)

This invention relates in particular to a mechanism and method for conveying small hollow articles such as extruded aluminum cans, collapsible tubes or the like wherein the cans are transferred from an endless conveyor upon which the cans are dropped more or less haphazardly, for example, from a drying oven, to supporting pins on another endless conveyor that is utilized for conveying the cans to some desired point, such as apparatus for applying a coating to the exterior of the cans, or a printing mechanism.

A primary object of the invention is to provide a mechanism and method of the general character described wherein there shall be a novel and improved association of a plurality of conveyors which shall require only a relatively small space; which shall be simple in construction and operation; and which shall receive the cans, collapsible tubes, or other hollow articles in a more or less haphazard order and accurately apply them to equidistantly spaced supporting pins mounted on a continuously moving conveyor, with a minimum of attention from an operator.

Another object is to provide a novel and improved construction, combination, and arrangement of a supply conveyor to receive the articles from a given source, for example, a drying oven, a receiving conveyor having continuously movable article supporting pins, a transfer conveyor assembly for taking the articles from the supply conveyor and locating or orienting them individually with the pins of the receiving conveyor, and means for automatically forcing the articles from the transfer conveyor onto the corresponding pins, all automatically and requiring only the occasional attention of the operator.

Other objects, advantages, and results of the invention will be brought out by the following description in conjunction with the accompanying drawings in which:

FIGURE 1 is a fragmentary schematic top plan view of mechanism combining the invention;

FIGURE 2 is a side elevation thereof on the plane of the line 2—2 of FIGURE 1;

FIGURE 3 is a vertical sectional view approximately on the plane of the line 3—3 of FIGURE 1; and FIGURE 4 is a fragmentary sectional view approximately on the plane of the line 4—4 of FIGURE 1.

Specifically describing the illustrated embodiment of the invention, the reference character A designates a receiving conveyor on which the articles, such as hollow aluminum cans B having one end thereof open, are deposited from a given source, for example, a drying oven in which a lacquer coating on the cans has been baked. The cans are moved laterally in a linear path by the conveyor and are deposited on an endless belt conveyor C of a transfer conveyor assembly that includes another endless conveyor D onto which the cans are deflected from the conveyor C and are moved momentarily in synchronism, each in alignment with one of the supporting pins 1 of the receiving conveyor E onto which the cans are transferred for conveyance of the cans to a desired point, for example, to a machine for applying a coating to the cans or to a machine for printing a trademark or the like on the cans.

As shown, the receiving conveyor A includes two spaced and parallel sprocket chains 2 mounted on sprockets 3 that are carried by shafts 4 journaled in a frame structure generally designated F and driven in any suitable manner, as by a sprocket and chain connection 5 between one of the shafts 3 and a source of power not shown. Mounted on the conveyor chains and extending transversely therebetween are a plurality of parallel flight plates 6 that have arcuately convex upper surfaces and are spaced apart in such a manner as to provide a concave seat or groove 7 for a can B between each two adjacent flight plates as best shown in FIGURE 4. The cans B are dropped onto this conveyor more or less haphazardly between two parallel restraining rails 8, each can automatically falling by gravity into one of the concave seats 7. Desirably, a guide arm 8a is mounted on the frame structure with a portion inclined into the path of movement of the cans so as to line up the cans before they are dropped onto the conveyor C.

The conveyor C of the transfer conveyor assembly comprises an endless belt 9 mounted on pulleys 10 journaled on the frame structure and driven in any suitable manner, as by a chain and sprocket connection 11 of one of the pulleys with a suitable source of power. The conveyor belt 9 is arranged at the discharge end of the receiving conveyor A with its lower reach arranged to receive the cans B by action of gravity from the conveyor A as best shown in FIGURE 4. The cans fall one by one from the conveyor A over a downwardly inclined guide plate 12 onto the lower reach of the conveyor belt and against a stop and deflector rail 13 which prevents the cans from rolling off the belt. As shown, the stop rail is mounted on a bracket bar 14 which is secured to the frame structure in any suitable manner. As best shown in FIGURE 1, the rail 13 is disposed diagonally with respect to the belt reach so that as the cans are moved by the belt along the rail, the cans are rolled transversely of the belt reach and at a point above the conveyor D are forced off the belt and dropped by gravity onto the conveyor D which is disposed beneath the belt as best shown in FIGURE 2.

The conveyor D comprises a pair of sprocket chains 16 mounted on sprocket 17 which is carried by shafts 18 journaled in the frame structure; and mounted on the chains and extending transversely thereof there are a plurality of equidistantly spaced flight plates 19 similar to the plates 6, and between each tube is formed a seat groove 20 for a can. The seat grooves are spaced apart distances corresponding to the spacing of pins 1 on the conveyor E, and the conveyors D and E are moved in synchronism by any suitable means. As shown, one of the shafts 18 has a sprocket 21 mounted thereon that engages one of the reaches of the sprocket chain 22 of the conveyor E which is driven in any suitable manner, as by sprockets 23 mounted on shafts 24, one of which is connected to a suitable source of power in known manner. The cans are moved by the conveyor D in the same direction as the pins on the conveyor E indicated by the arrow in FIGURE 1, and during their movement each can becomes juxtaposed to the outlet end of an air jet pipe 25 with which the pins 1 become aligned in succession, and at the moment that the can becomes juxtaposed to the air jet as indicated in FIGURES 1 and 2 a jet of air under pressure is forced through the jet pipe and against the bottom wall of the can so as to slide the can off the conveyor E and onto the pin that is in alignment with the can. The jet pipe ordinarily will be controlled by a valve mechanism in timed relation to movement of the conveyors, but such mechanism has been omitted in the interests of simplicity, but of course a valve 26 at the jet pipe could be manually controlled.

It is desirable that more positive means than the conveyor chain 22 be provided for accurately holding the pins 1 in proper position to receive the cans from the conveyor D; and for this purpose, a roller 27 may be mounted on each pin to roll on a horizontal track 28 that is mounted on the frame structure so that the track will cooperate with the conveyor chain in supporting the pins as they move past the conveyor D and into alignment with the outlet of the air jet pipe 25.

It will be understood by those skilled in the art that while the now preferred embodiment of the invention has been illustrated, many modifications and changes in the construction of the mechanism may be made within the spirit and scope of the invention.

We claim:

1. Conveyor mechanism for cylindrical hollow articles each of which has an open end, comprising a receiving conveyor having a linearly movable horizontal portion and a plurality of pins mounted thereon and projecting therefrom in equidistantly spaced relation each to freely telescopically receive one of said articles thereover, a supply conveyor having a linearly movable portion parallel to and spaced from the receiving conveyor and having seats spaced longitudinally thereof into which articles are deposited gravitationally from a source of supply, a transfer conveyor assembly including a first transfer conveyor at right angles to the supply conveyor at the discharge end thereof to receive said articles gravitationally from the supply conveyor and move them endwise toward the receiving conveyor with their open ends leading, a second transfer conveyor parallel to and between said supply conveyor and the receiving conveyor upon which said articles are discharged from the first transfer conveyor with their open ends facing the receiving conveyor, said second transfer conveyor being movable synchronously with the receiving conveyor and having seats to gravitationally receive and position said articles in spaced apart relation corresponding to the spaced apart relation of said pins of the receiving conveyor and each with its open end coaxial with a pin, and means for pushing said articles endwise from the second transfer conveyor each telescopically onto one of said pins.

2. Conveyor mechanism for cylindrical hollow articles each of which has an open end, comprising a receiving conveyor having a linearly movable horizontal portion and a plurality of pins mounted thereon and projecting therefrom in equidistantly spaced relation each to freely telescopically receive one of said articles thereover, a supply conveyor upon which said articles are deposited from a source of supply and having a horizontal portion linearly movable parallel to said linearly movable portion of the receiving conveyor and provided with a plurality of transverse grooved seats each to receive an article, a transfer conveyor assembly including a first transfer conveyor having a horizontal portion linearly movable at right angles to said linearly movable portion of the supply conveyor at the discharge end of the latter to receive said articles by gravity from the supply conveyor and move them endwise toward said receiving conveyor with their open ends leading, a second transfer conveyor between said supply conveyor and said receiving conveyor and having a horizontal linearly movable portion in parallel and spaced relation to the linearly movable portion of the receiving conveyor and provided with a plurality of grooved seats in equidistantly spaced apart relation corresponding to the spaced apart relation of said pins of the receiving conveyor each to receive an article gravitationally from said first transfer conveyor with their open ends facing the receiving conveyor, said second transfer conveyor being continuously movable synchronously with said receiving conveyor with each grooved seat in said linearly movable portion in alignment with one of said pins providing for positioning of an article in the seat with its open end coaxial with the pin, and means for pushing said articles endwise from said second transfer conveyor each telescopically onto one of said pins.

3. Conveyor mechanism as defined in claim 1 wherein the supply conveyor is endless with lower and upper reaches the latter of which constitutes said linearly movable portion, said first transfer conveyor is endless with upper and lower horizontal reaches the latter of which constitutes said linearly movable portion and is disposed below the upper reach of the supply conveyor providing for dropping of the articles from the supply conveyor onto said lower reach of the first transfer conveyor, said second transfer conveyor is endless with lower and upper reaches the latter of which is below said lower reach of the first transfer conveyor and constitutes said linearly movable portion and a deflector rail along which said articles are moved on said first transfer conveyor to roll the articles laterally off the first transfer conveyor onto the second transfer conveyor.

4. Conveyor mechanism as defined in claim 2 wherein the supply conveyor is endless with lower and upper reaches the latter of which constitutes said linearly movable portion, said first transfer conveyor is endless with upper and lower horizontal reaches the latter of which constitutes said linearly movable portion and is disposed below the upper reach of the supply conveyor providing for dropping of the articles from the supply conveyor onto said lower reach of the first transfer conveyor, said second transfer conveyor is endless with lower and upper reaches the latter of which is below said lower reach of the first transfer conveyor and constitutes said linearly movabl portion and a deflector rail along which said articles are moved on said first transfer conveyor to roll the articles laterally off the first transfer conveyor onto the second transfer conveyor.

5. Conveyor mechanism as defined in claim 2 wherein the last-named means comprises an air jet pipe having an outlet that is disposed above and in alignment with one of said seats in the linearly movable portion of the second transfer conveyor and between which and said receiving conveyor said articles are moved.

6. Conveyor mechanism for cylindrical hollow articles each of which has an open end, comprising a receiving conveyor having a linearly movable horizontal portion and a plurality of pins mounted thereon and projecting therefrom in equidistantly spaced relation each to freely telescopically receive one of said articles thereover, a supply conveyor parallel to and spaced from the receiving conveyor upon which articles are deposited from a source of supply with the open ends facing toward said receiving conveyor, a transfer conveyor assembly including a first transfer conveyor at right angles to the supply conveyor at the discharge end thereof to receive said articles gravitationally from the supply conveyor and move them endwise toward the receiving conveyor with their open ends leading, a second transfer conveyor parallel to said supply conveyor and the receiving conveyor upon which said articles are discharged from the first transfer conveyor with their open ends facing the receiving conveyor, said second transfer conveyor being movable synchronously with the receiving conveyor in the same direction and having means to position said articles in spaced apart relation corresponding to the spaced apart relation of said pins of the receiving conveyor and each with its open end coaxial with a pin, and means for pushing said articles endwise from the second transfer conveyor each telescopically onto one of said pins.

References Cited in the file of this patent

UNITED STATES PATENTS

| 2,713,409 | Bartlett | July 19, 1955 |
| 2,796,164 | Hakogi | June 18, 1957 |
| 2,835,371 | Davis | May 20, 1958 |